(12) United States Patent
Haartsen et al.

(10) Patent No.: US 6,570,857 B1
(45) Date of Patent: May 27, 2003

(54) CENTRAL MULTIPLE ACCESS CONTROL FOR FREQUENCY HOPPING RADIO NETWORKS

(75) Inventors: Jacobus Haartsen, Borne (NL); Johannes Elg, Malmö (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/210,594

(22) Filed: Dec. 15, 1998

Related U.S. Application Data
(60) Provisional application No. 60/071,262, filed on Jan. 13, 1998.

(51) Int. Cl.[7] .................................................. H04J 3/24
(52) U.S. Cl. ....................... 370/312; 370/328; 370/349; 370/432
(58) Field of Search .......................... 370/322, 328–329, 370/337, 345–350, 431, 442, 449–450, 312–313, 338, 475, 375, 443, 468, 432, 321, 323

(56) References Cited

U.S. PATENT DOCUMENTS

| | | | |
|---|---|---|---|
| 4,680,583 A | | 7/1987 | Grover |
| 5,025,486 A | * | 6/1991 | Klughart |
| 5,297,144 A | | 3/1994 | Gilbert et al. |
| 5,475,681 A | * | 12/1995 | White et al. |
| 5,577,043 A | | 11/1996 | Guo et al. |
| 5,668,803 A | * | 9/1997 | Tymes et al. |
| 5,754,535 A | * | 5/1998 | Vandenabeele et al. ..... 370/321 |
| 6,236,674 B1 | * | 5/2001 | Morelli et al. |
| 6,246,670 B1 | * | 6/2001 | Karlsson et al. |
| 6,246,677 B1 | * | 6/2001 | Nap et al. |

FOREIGN PATENT DOCUMENTS

| | | |
|---|---|---|
| WO | 97/48216 | 12/1997 |

\* cited by examiner

*Primary Examiner*—Melvin Marcelo
*Assistant Examiner*—Inder Pal Mehra
(74) *Attorney, Agent, or Firm*—Burns, Doane, Swecker & Mathis, L.L.P (57) ABSTRACT

A system comprises a wireless master unit and one or more wireless slave units, each having a unique identifier. When a wireless slave unit is active, it is addressed by one of a limited number of temporary addresses. A PARK mode enables a wireless slave unit to be in an idle state during which its temporary address is deallocated, enabling that address to be assigned to another wireless slave unit. To page a parked slave, a paging beacon packet is broadcast to, and received by, each of the wireless slave units at fixed intervals during a master-to-slave time slot. Each wireless slave unit determines whether the received paging beacon packet includes its unique identifier. If so, the wireless slave units retrieves a temporary address from the paging beacon packet. The wireless unit transmits a response to the wireless master unit during a subsequent slave-to-master time slot if the received paging beacon packet included the unique identifier belonging to the wireless slave unit. Parked wireless slave units are also assigned a unique response number by the master. The master broadcasts a polling beacon packet during a master-to-slave time slot. If the parked slave unit desires access to the channel, it transmits a response in an N:th slave-to-master time slot following the polling beacon packet, where N is a function of the slave's unique response number.

24 Claims, 5 Drawing Sheets

CENTRAL MULTIPLE ACCESS CONTROL FOR FREQUENCY HOPPING RADIO NETWORKS

CROSS-REFERENCE TO CO-PENDING APPLICATION

This application claims the benefit of U.S. Provisional Application No. 60/071,262, filed Jan. 13, 1998, which is hereby incorporated herein by reference in its entirety.

BACKGROUND

The invention relates to radio networks, that are networks in which units wirelessly exchange information by way of radio signals. In particular, radio networks in which the air interface applies frequency hopping to spread the signal over a wide spectrum are considered. The problem addressed is the multiple access of different units on a common, frequency hopping channel.

The system considered is based on a frequency hopping (FH) system, different aspects of which are described in U.S. patent application Ser. Nos. 08/685,069; 08/932,911; and 08/932,244; as well as U.S. Provisional Application No. 60/109,692, filed on Nov. 24, 1998 in the name of J. Haartsen which are all hereby incorporated herein by reference. In this system, a channel is defined as a frequency hop sequence which is a pseudo-random number (PN) sequence determined by the identity of one of the units participating on the channel, called the master. The phase in the sequence is determined by a master clock associated with the master. As the master clock progresses, the channel hops from radio frequency (RF) hop frequency to RF hop frequency at the clock rate. All other units participating on the channel, called slaves, are synchronized to the FH scheme by using the same FH sequence and same clock as used by the master. The channel shared between the master and the one or more slaves is called a piconet.

At connection setup, the master parameters that are required to maintain FH synchronization are transferred from the master to the slave. A strict Time Division Duplex (TDD) scheme is adhered to: time slots ("slots") in which traffic is transferred from master to slave and slots in which traffic is transferred from slave to master, alternate at the hopping rate. Preferably, a high hopping rate is used in order to obtain immunity against interferers that share the spectrum. A high hopping rate results in short slots and small packets.

The master controls the access on the channel. A distributed access method, like carrier-sense multiple access, is not useable due to the fast hopping of the channel; the dwell time on a RF hop frequency is too short to carry out an effective contention-based access scheme. On the other hand, reserved access schemes like TDMA are not suitable for packet-switched data connections. Therefore, a polling scheme is used which is entirely controlled by the master of the piconet. At any moment in time, a master may select any of the slaves participating on the channel to send data to in the master-to-slave slot. However, only the slave addressed by the master in this master-to-slave slot may respond in the succeeding slave-to-master slot.

In this scheme, the master selects a slave in the master-to-slave slot to send data to and from which it can receive data. As a result, collisions between slaves that want to send information to the master at the same time are prevented. When the master sends information to slave X, this implicitly means that slave X may respond in the next slave-to-master slot. The slave is implicitly polled by the master. If the master has no data to send, it may send a specific 'poll' packet to give the slave a chance to respond. A poll packet is a very short packet carrying no data.

The addressing scheme in the system is carried out as follows. Each unit has a unique identity which is, for example, derived from the 48-bit IEEE 802 addressing space. The identity of the master is used to form the FH sequence used by the channel in the piconet. Each packet is preceded by a preamble which is also derived from the master identity. This preamble is used by all the units participating in the piconet to identify whether there is a packet present in the slot, and if so whether the packet belongs to this piconet. Since many uncoordinated frequency hopping piconets may be co-located, occasionally they may happen to land on the same hop frequency. The preamble prevents the users in one piconet from accepting packets belonging to another piconet. The master address therefore identifies the piconet (or channel) and can be regarded as a channel identifier.

To distinguish between the different participants on the piconet, a short length Medium Access Control (MAC) address is used which is temporarily allocated by the master to the slave when the slave is connected to the piconet. The MAC address is located in the header of the packet. The master uses the proper MAC address to address a slave. The size of the MAC address is preferably small in order to minimize the overhead in the packet header. As was mentioned before, the system preferably uses a fast hopping rate. As a result, the packet can only be short and the amount of overhead (including the MAC address) must be minimized. However, the use of only a short-length MAC address limits the number of slaves that can simultaneously participate on the channel.

Slaves that do not have to exchange a great deal of information can be placed in a low power mode called HOLD. When the slave is in the HOLD mode, it does not participate on the channel. It neither transmits nor receives data, but it does keep its clock running (so that it remains synchronized to the FH channel), and it retains its MAC address. At the conclusion of a HOLD interval (the duration of which is agreed upon by both the master and the slave prior to entering the HOLD mode), the slave leaves the HOLD mode and participates on the channel as before.

Units that want to remain locked to the channel can enter the HOLD mode to save power consumption. However, since they keep their MAC addresses, units that rarely participate on the channel deny access to the channel to other units since the MAC address space is limited. This inefficient use of the MAC addresses is more of a problem in those described FH systems in which the MAC address is short (to minimize overhead), resulting in only a few slaves being able to participate on the channel.

SUMMARY

It is therefore an object of the present invention to provide techniques for keeping units synchronized to the channel in a piconet without requiring them to retain their MAC addresses.

The foregoing and other objects are achieved in apparatuses and methods of operating a system comprising a wireless master unit and one or more wireless slave units, wherein each of the one or more wireless slave units has a unique identifier. In accordance with one aspect of the invention, a wireless slave unit may be in a so-called PARK mode, in which it is not associated with a temporary address (e.g., a MAC address described in the BACKGROUND section). In order to page a parked wireless slave unit, a paging beacon packet is broadcast to, and received in, each of the one or more wireless slave units at fixed intervals during a master-to-slave time slot. Each wireless slave unit, determines whether the received paging beacon packet includes the unique identifier belonging to the wireless slave unit. If it does, then the wireless slave unit retrieves a temporary address from the paging beacon packet, and transmits a response to the wireless master unit during a subsequent slave-to-master time slot.

In another aspect of the invention, the wireless slave unit can determine whether a subsequent traffic packet from the wireless master unit includes the temporary address and, if so, respond by transmitting a response to the wireless master unit during another subsequent slave-to-master time slot.

In yet another aspect of the invention, the paging beacon packet is a type of beacon packet, wherein beacon packets have a header portion that includes a predefined temporary address that is never assigned to any of the one or more wireless slave units in the system.

In still another aspect of the invention, parked wireless slave units are offered an opportunity to request access to the piconet. This is accomplished by defining a series of time slots comprising alternating occurrences of a master-to-slave time slot and a slave-to-master time slot, wherein each of the slave-to-master time slots comprises a plurality of slave-to-master sub-slots. Depending on the embodiment, the number of sub-slots per slave-to-master time slot may be any integer greater than or equal to 1. Furthermore, a unique response number is allocated to each of the one or more wireless slave units. A polling beacon packet is broadcast by the master unit to each of the one or more wireless slave units at fixed intervals during a master-to-slave time slot. Receipt of the polling beacon packet by a wireless unit indicates an opportunity to request access to the piconet. Accordingly, if a wireless unit desires to access the piconet, it transmits a packet to the wireless master unit during a slave-to-master sub-slot that occurs N slave-to-master sub-slots after the polling beacon packet, wherein N is a function of the unique response number of the at least one or more wireless slave units.

In yet another aspect of the invention, the master unit is not required to give each of the wireless units an opportunity to respond to the polling beacon packet. To accommodate this possibility, a slave unit detects whether any master activity occurred in the master-to-slave time slot immediately preceding the slave-to-master sub-slot that occurs N slave-to master sub-slots after the polling beacon packet, and if so, transmits the packet to the wireless master unit only if no master activity was detected in the master-to-slave time slot immediately preceding the slave-to-master sub-slot that occurs N slave-to-master sub-slots after the polling beacon packet.

In still another aspect of the invention the wireless master unit receives the response packet from the at least one of the one or more wireless slave units, and determines which of the one or more wireless slave units transmitted the packet by determining which slave-to-master sub-slot the packet was received in, relative to the master-to-slave time slot during which the polling beacon packet was broadcast.

BRIEF DESCRIPTION OF THE DRAWINGS

The objects and advantages of the invention will be understood by reading the following detailed description in conjunction with the drawings in which.

DETAILED DESCRIPTION

An overview of various aspects of the invention will first be presented, followed by an even more detailed description.

Overview

A method is described in which units remain synchronized to the frequency hopping channel without owning a MAC address. These units are in a new mode referred to herein as PARK mode. The channel identifier is used to initially communicate between the piconet master and parked slaves. When a parked slave wants to become active, it indicates this to the master, at which time the master allocates this slave a free, temporary MAC address. Once active, the slave can participate in the piconet, and can occasionally be put on HOLD for short time periods keeping its MAC address. For longer periods of inactivity, the slave can enter the PARK mode, giving up its MAC address in the process, thereby freeing up the MAC address for use by a different slave.

To support the PARK mode, the master transmits a broadcast packet at fixed intervals, which operates as a kind of beacon. The broadcast packet is identified by the all-zero MAC address. All slaves in PARK mode always wake up to read the beacon. If the master wants a parked slave to become active, it issues a paging message in the payload of the beacon packet. This paging message includes the full 48-bit identity of the slave and the temporary MAC address to be used by this slave. Only the slave that was paged is allowed to respond in the next slave-to-master slot.

A different scheme is used to permit parked slaves to access the channel without being paged. When the slave enters the PARK mode, it is allocated a response number that determines when the parked slave is allowed to respond without being explicitly/individually paged. The slaves are allowed in the slave-to-master slot which are preferably (but not required to be) divided into a plurality of slave-to-master sub-slots for this purpose. In the exemplary embodiment described herein, the number of slave-to-master sub-slots in each slave-to-master slot is two, and these slave-to-master sub-slots are therefore referred to herein as half-slots. It should be understood that alternative embodiments can easily be derived from the description of the exemplary embodiment by substituting the term "slave-to-master sub-slots" in place of the term "half slots", thereby indicating that there may be more or even fewer than two of such slots.

Continuing now with the exemplary embodiment, in which the slave-to-master sub-slots are half slots, a parked slave with response number N is allowed to send a message in the Nth slave-to-master half slot counted from the beacon packet, provided no master activity has been detected in the master-to-slave slot precisely preceding this response slot. The response message will consist of the channel identifier (preamble) only. The position of the response message with respect to the beacon packet tells the master which parked slave is requesting access. The master may grant the access by directly sending a (broadcast) paging message mentioned before in the next master-to-slave slot. Alternatively, the master may wait until all parked slaves have had a chance to respond, and then make a decision regarding which slave to address. Parked slaves that have requested access but are not granted access should keep listening to the channel for (broadcast) paging messages, because the master may grant access to the requesting slaves sequentially before the next beacon occasion. Parked slaves that have not issued an access request can enter the sleep mode until the next beacon occasion.

To enter a PARK mode, the slave unit must first be registered with the piconet master. This registration couples the identity of the parked slave to the response number (which should always be kept as low as possible). The master should regularly do registration updates so that slaves that were formerly parked but have left the coverage area, can be de-registered so that the response number can be reused for another parked slave. Parked slaves with high priority should be issued lower response numbers than parked slaves having lower priority.

If the master is already engaged with another (active) slave at the designated time for a beacon transmission, it does not have to abort its operations. Instead it may defer the beacon transmission to the next available master-to-slave slot. The parked units will wake up and read the channel identifier to adjust their clocks. Units not desiring access can then return to sleep until the next beacon event. Units that desire access remain awake and wait until the beacon packet indeed passes along.

The invention distinguishes between active slaves in a high-power mode and inactive slaves in a low-power mode. By reserving the MAC address for the active slaves only, a large number of inactive slaves can be supported without much overhead on the channel. For bursty data traffic, active and inactive slaves can be swapped (reusing the MAC addresses) based on their traffic requirements. In this way, the number of slaves virtually connected to the channel can be much larger than indicated by the MAC address.

More Detailed Description

The various features of the invention will now be described in even greater detail with respect to the figures, in which like parts are identified with the same reference characters. In order to facilitate a better understanding of the invention, the focus of the discussion is on the air interface, the types of communications that take place between master and slave units, and on the various ways that master and slave units respond to receipt of various types of packets. Those having ordinary skill in this art should have no trouble designing and making operable systems based on the functional description presented herein. Such systems may include, for example, programmable equipment that executes program instructions created in accordance with the principles set forth herein, and stored in any of a variety of computer readable storage media, including but not limited to Random Access Memory (RAM), magnetic storage media (e.g., hard and/or floppy disks) and optical storage media (e.g., Compact Disc (CD) Read Only Storage (ROM)).

Private radio communications require the deployment of unlicenced bands. Presently there is not much unlicenced radio spectrum that is globally available. One band, the Industrial, Scientific, Medical (ISM) band at 2.4 Ghz is an exception; it is available worldwide although the precise operational channels may differ per country.

The usage of the ISM band is restricted to radio systems applying signal spreading. In this way, uncoordinated systems spread their interference. Each system is given a fair chance to make use of the spectrum and no single system can dominate the usage. A cost-effective spreading method is the use of frequency-hop spreading, that is the ISM band is divided into a number, M, of RF hop frequencies and the channel hops from one hop frequency to the next according to a pseudo-random hop sequence.

The hopping rate is restricted to a minimum of 2.5 hops/s. The choice of the hopping rate depends on a number of criteria. To obtain the optimal interference immunity (through interference diversity and statistical multiplexing) a high hopping rate is desired. If a hop is lost due to interference, only a small burst of the communications is lost. This is especially advantageous for voice communications which can overcome only short periods of high bit error rates without noticeable effects. For data communications, the choice of a suitable hopping rate depends on the choice of access scheme. For an ethernet-like access scheme, like carrier-sense multiple access (CSMA, also known as "listen before talk"), a slow hopping is desired for optimal contention resolution.

Figure 1:
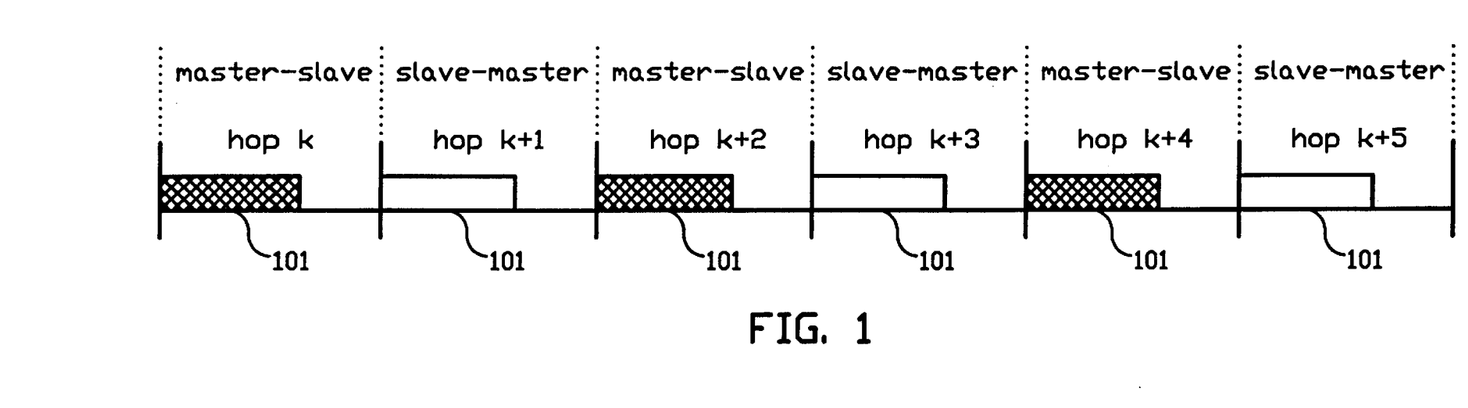
FIG. 1 is a timing diagram of an exemplary air interface in accordance with one aspect of the invention.
Figure 2:
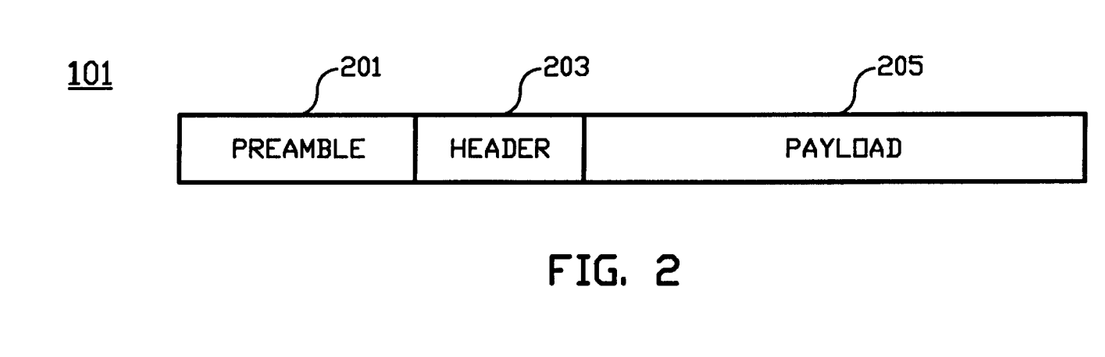
FIG. 2 is a diagram of an exemplary packet format for use on the air interface in accordance with one aspect of the invention.

If voice and data have to be combined, a high hopping rate must be used for voice transmission, requiring a different access scheme for the data. Instead of CSMA/CA (CSMA/ collision avoidance), a polling scheme is used in which a central unit, the master, controls the access to the channel. The system has been designed in which all units are peer units in principle, but when establishing a connection between the units, one of the units will be the master whereas the other units will become slaves. The master-slave relation is only valid for the duration of the connection. The master can set up a piconet. The piconet uses a FH channel at a high hopping rate. A strict TDD scheme is used in which the master-to-slave and slave-to-master transmissions alternate at the hopping rate. The FH sequence is determined by the master identity, the phase in the sequence is determined by the master system clock. At connection setup, the master transfers its identity and clock to all slaves. By using this single identity and clock, all users (master and slaves) are synchronized and can follow the hopping channel. FIG. 1 is a timing diagram of an exemplary FH-TDD channel as meant in this disclosure. Each packet 101 used on the channel is uniquely identified by a preamble. This is, for example, a 64-bit unique word with good cross- and auto-correlation properties. The preamble is derived from the master identity. A packet 101 has to have the proper preamble before it is accepted by the participating units. The preamble can be regarded as the channel identifier since it identifies the packets belonging to the channel. A packet 101 has a typical format as shown in FIG. 2. In the example, the preamble 201 is followed by a header 203 which is followed by a payload 205.

Each unit has a unique identity, which is for example derived from the 48-bit IEEE 802 address space. This identity is only used at the time of call set up for the purpose of paging a unit. During the connection, a temporary MAC address is used. This can be a much smaller address, for example 3 bits, since it only has to distinguish between the participating units. This MAC address is part of the header 203. The addressing is schematically shown in greater detail in FIG. 3. Each unit has a unique identity (wake-up identifier) 301 which is used during the paging process. A channel identifier 307 is derived from the master identity 303. Finally, a MAC address 305 in the header identifies the units participating in the same piconet. The unit identities 301 and the derived channel identifiers 307 are unique. The MAC address 305 is only allocated temporarily and is valid during the connection. The all-zero MAC address is reserved for broadcast messages. To avoid collisions on the channel, the master and slave strictly follow the TDD scheme: the master is only allowed to transmit in the master-to-slave slot, and the slaves are only allowed to transmit in the slave-to-master slot. In order to avoid collisions between slaves, the only slave that is allowed to transmit is that slave which was addressed with its MAC address 305 by the master in the preceding master-to-slave slot. This is called polling: a slave can only respond when polled/addressed by the master. This polling can occur implicitly, that is by sending a packet containing traffic in the payload addressed to the proper slave; or explicitly by using a special POLL packet without payload but addressed to the proper slave.

Figure 3:
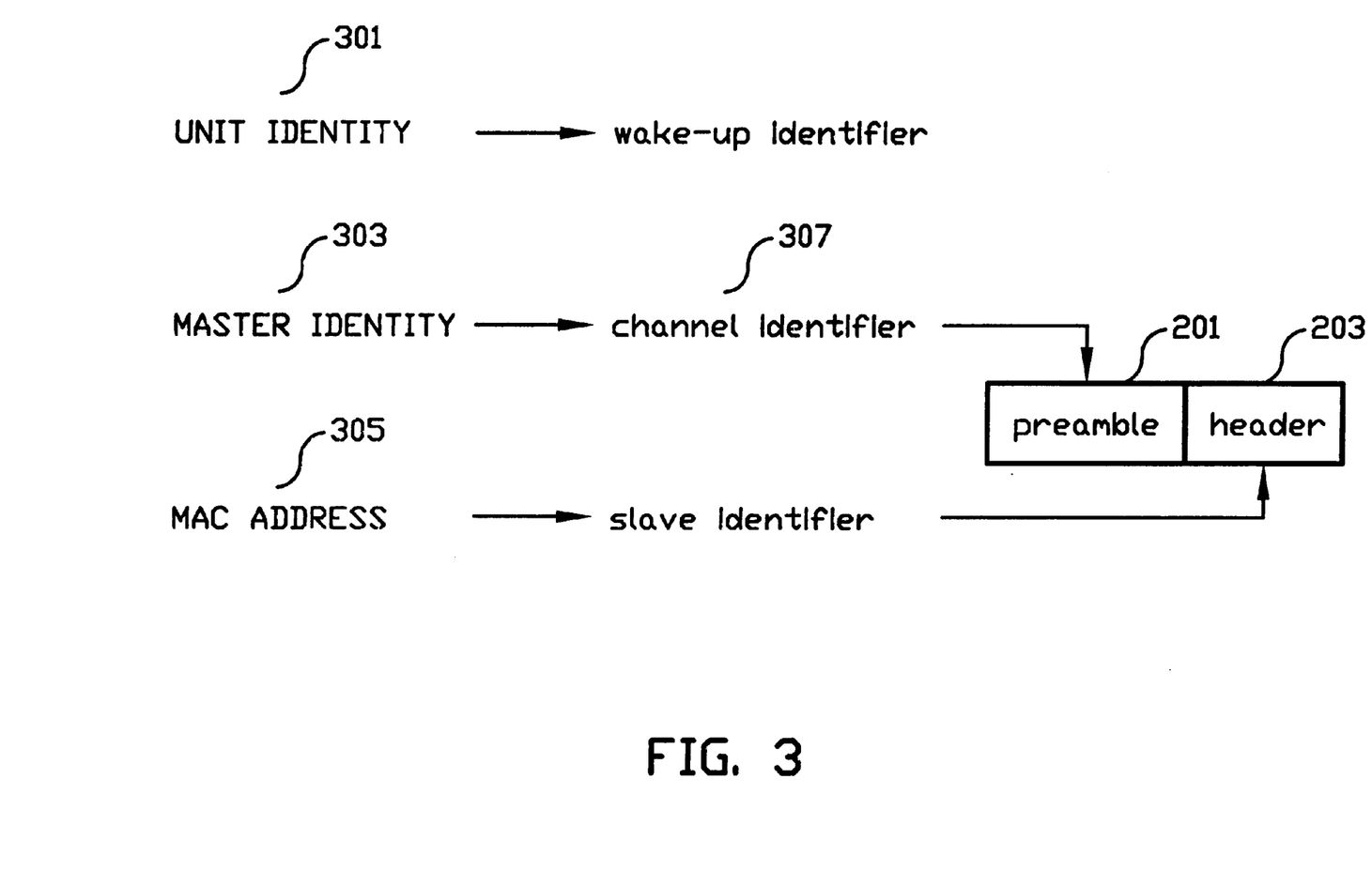
FIG. 3 schematically depicts an exemplary addressing scheme for use with the air interface in accordance with one aspect of the invention.

The MAC address 305 is much smaller than the unit identity 301. This will reduce the overhead in the packet because the (Forward Error Correction (FEC) encoded) MAC address 305 is present in each packet header. However, this limits the amount of units that can participate in a piconet. In particular, units that want to be attached to a piconet but not actively involved in communications (like sleeping participants) need a MAC address 305 which is inefficiently used. Therefore, a method is now described that allows units to remain parked to the piconet channel, without their being assigned a MAC address 305.

Units that have been in connection with the piconet have all the information needed to remain synchronized to the piconet, that is, they have the master identity 303 and the master clock. From the master identity 303, the FH sequence and the channel identifier 307 (packet preamble) can be derived; from the clock, the phase in the FH sequence can be derived. Occasionally, a unit has to listen to the master transmission to adjust its clock to account for clock drifts. We now distinguish between four different modes of operation: STANDBY, ACTIVE, HOLD, and PARK. In STANDBY, a unit is not attached to any other device. It periodically wakes up to listen to page messages. The page message must include the unit's identity. A unit in ACTIVE mode uses the master identity 303 and clock to keep synchrony to the FH channel and to extract the proper packets by filtering the packets with the proper preamble. In addition, it has a MAC address 305 to be recognized by the master. Units that for a short moment can be put inactive will enter the HOLD mode. In this mode, the slave sleeps for a pre-determined period of time, after which it becomes active again. During the sleep mode, the slave cannot get access to the channel, nor can it be reached by the master. A slave in HOLD mode retains its MAC address 305. A slave that can be put inactive for a longer amount of time will enter the PARK mode. In this mode, a slave gives up the MAC address 305, thereby making that MAC address 305 available for assignment to another slave unit. The slave in PARK mode wakes up periodically to listen for the channel identifier 307 to adjust its clock to account for drifts.

To let parked units participate again, a special access method has to be carried out. A master can activate a parked unit by paging it. To facilitate this paging, the master transmits a broadcast message at regular intervals (hereinafter also referred to as a beacon). During this beacon event, the parked unit can become active again, so in principle, the parked slave only has to wake up during the beacons. The broadcast message is identified by a predefined MAC address that is never assigned to any of the slaves. In the exemplary embodiment, the predefined MAC address is the all-zero MAC address. To activate a parked slave, the master pages this slave by including the slave's identity 301 in the payload 205 of the broadcast packet 101. In addition, the payload 205 includes the (temporary) MAC address 305 to be used by the parked slave. A slave paged in this manner is allowed to respond directly in the slave-to-master slot following. The slave also retains the assigned MAC address 305, so that it will recognize future packets directed to it by the master unit.

For the parked slave to get access to the channel, a different approach is required. Again, collisions between different parked slaves that desire access simultaneously, must be avoided. The following scheme is used. When entering the PARK mode, the parked unit is allocated a response number by the master. This response number is used by the parked slave to determine when it is allowed to transmit a channel access request to the master. Channel requests are only allowed when the beacon indicates that requests can be sent. Instead of polling each parked slave separately, a broadcast poll is transmitted indicating to the parked units that they are allowed to request access. However, the response number determines in which slot a parked slave is allowed to transmit an access request. In another aspect of the invention, in order to speed up the request procedure, the slave-to-master slots may be divided into a plurality of slave-to-master sub-slots. For purposes of illustration, the exemplary embodiment utilizes two half slots per slave-to-master slot. However, alternative embodiments may use more or fewer than two half slots per slave-to-master slot.

For a request, the parked slave only has to transmit the channel identifier 307 (which is just a preamble 201). The identifier and its position with respect to the broadcast poll indicates to the master which parked slave is requesting access. It can then send a page message to this slave (including the slave's identity 301 and a MAC address 305) to activate the slave.

Figure 4:
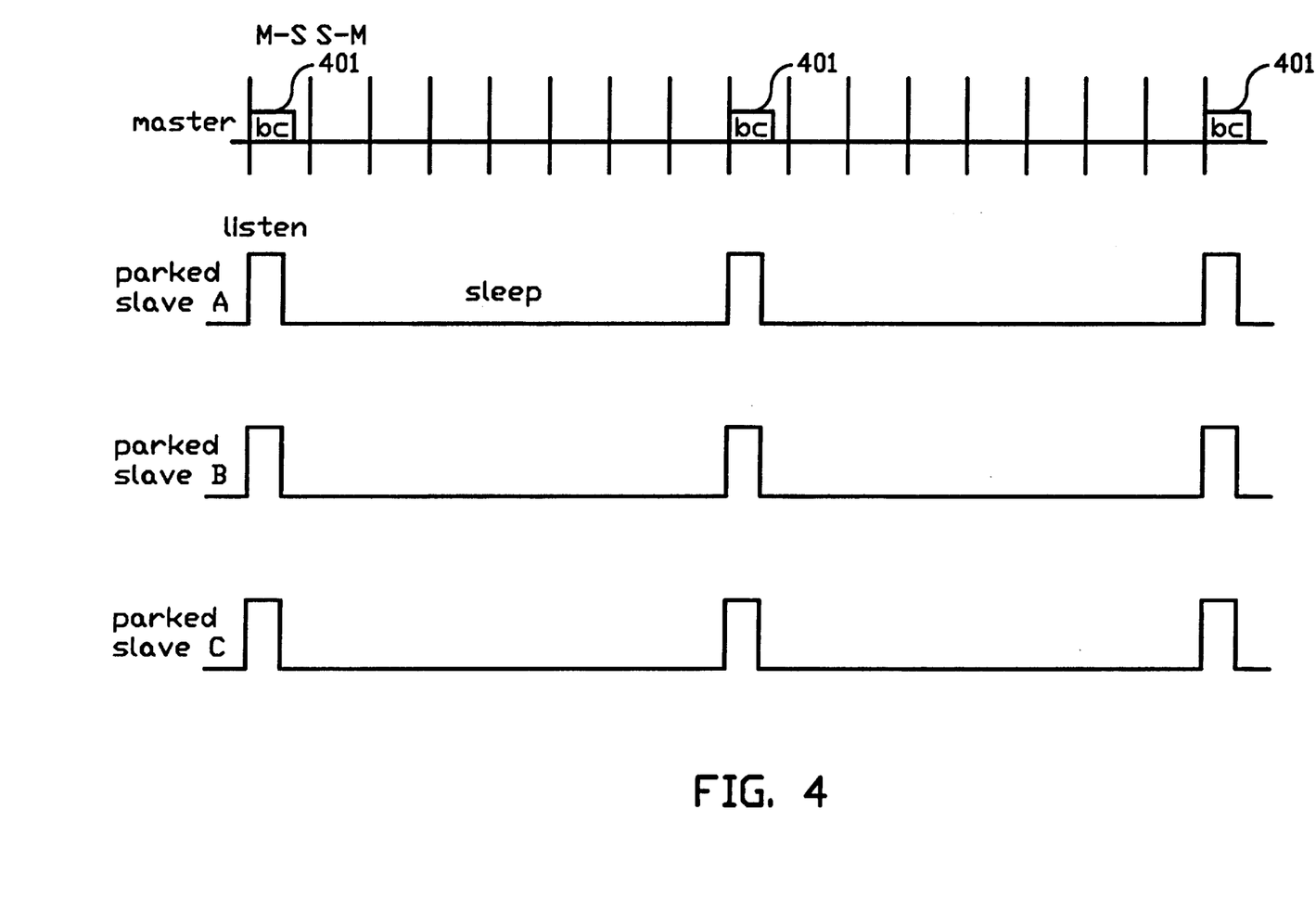
FIG. 4 is a timing diagram illustrating beacon transmission and park wake-up in accordance with one aspect of the invention.
Figure 5:
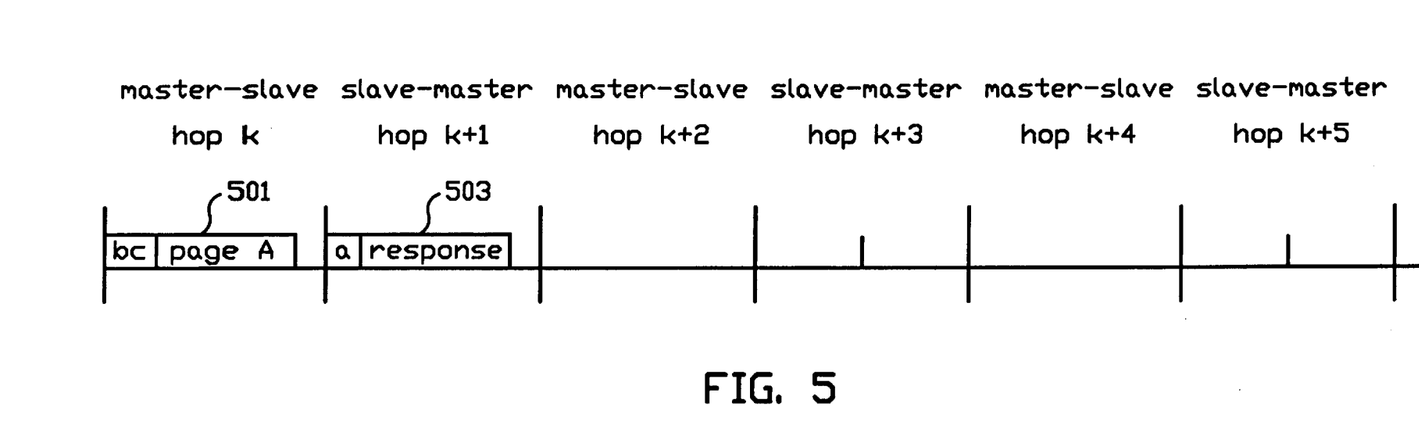
FIG. 5 is a timing diagram illustrating the paging of a parked slave A, in accordance with one aspect of the invention.

An example will further clarify the PARK mode procedures. FIG. 4 is a timing diagram showing how a broadcast message 401 (e.g., packet that includes a header 203 containing a zero MAC address) is sent at regular intervals to act like a beacon. Units in PARK mode only wake up during the beacon (or alternatively during only every N beacons in order to reduce power consumption). Referring now to FIG. 5, when a master wants to activate parked slave A, it sends a page message 501 including A's identity 301 and a temporary MAC address 'A'. In the slave-to-master slot following the page message 501, slave A can respond 503 as an activated slave using the just allocated MAC address 'A'.

Figure 6:
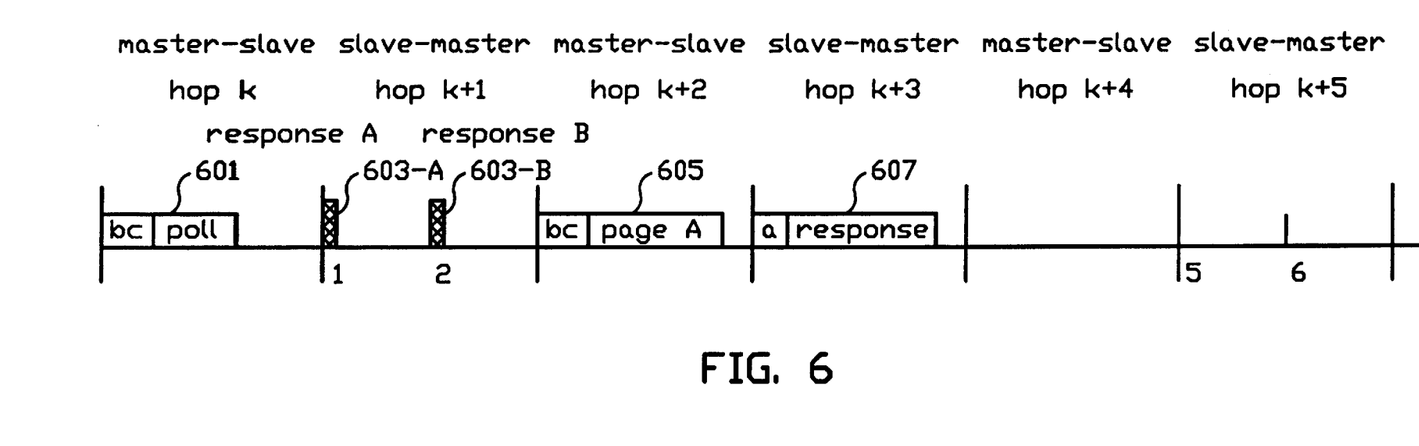
FIG. 6 is a timing diagram illustrating a parked slave's access resolution with immediate master action, in accordance with one aspect of the invention.
Figure 7:
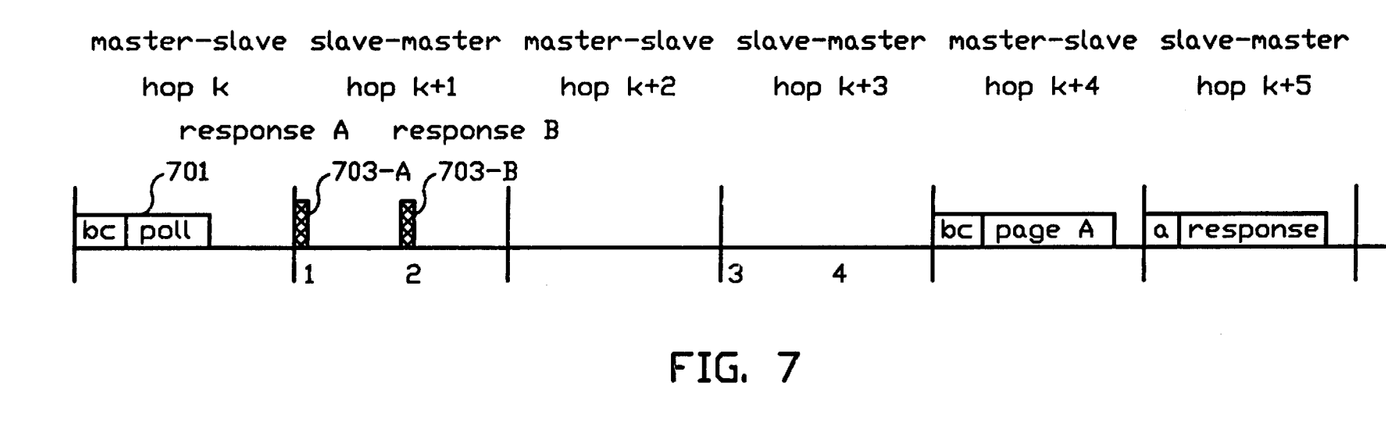
FIG. 7 is a timing diagram illustrating a parked slave's access resolution with deferred master action, in accordance with one aspect of the invention.

For a parked slave to gain access, the broadcast poll is used. FIGS. 6 and 7 are timing diagrams showing several ways of using the broadcast poll. Assume that there are three parked units A, B and C, and that these units have received response numbers 1 to 3, respectively. The broadcast poll 601 induces all parked units to respond if they want access. The parked units respond in the appropriate half slots according to their response number and send a short packet 603-A, 603-B containing the preamble only (channel identifier 307). In FIG. 6, the master does not await the response from C, but instead directly pages 605 unit A. Unit A's response 607 is transmitted in the very next slave-to-master slot.

In FIG. 7, the master transmits a broadcast poll 701, thereby making it possible for the parked units to respond if they want access. In this example, the master first collects all slave responses by waiting until all parked units have had a chance to respond (although unit C has no desire to access the channel), before it makes a decision and pages one of the units. In this example, units A and B respond with their respective short packets 703-A, 703-B containing the channel identifier 307 in the first and second half slots to occur after the broadcast poll 701. No short packet is transmitted in the third half slot however, because of unit C's lack of interest in accessing the channel. To accommodate for the case in FIG. 6, the parked units are only allowed to respond if in the master-to-slave slot immediately preceding their respond slot, no master activity is detected. For example, in the case of FIG. 6, unit C cannot respond in the first half slot in hop k+3 because of the presence of a page 605 in hop k+2.

Units that require access, but are not granted access right away, should keep listening to the master transmissions. Since a request has been received by the master, it may page the corresponding parked slave at any time, not only at the beacon instances.

In another aspect of the invention, a priority scheme can be defined by giving units with higher priority a lower response number. In all cases, it is preferred that the response numbers should be kept as low as possible to allow for a fast access. Therefore, the master should check to ensure that units that are registered as parked are still locked to the channel. This can, for example, be accomplished by having the master page a parked unit periodically, preferably with a long time interval between pages. When the parked unit responds, it is activated and may be placed back into the PARK mode. This registration check only takes a few slots (say 4 or 5 slots) and only has to be carried out infrequently (e.g., every 15–30 minutes), so the overhead is minimal. If a parked slave does not respond to the page, it should be removed from the PARK list, so that its response number can be reused by another unit.

In addition to the support for low-power modes, that is for units that want to remain locked to the channel without actually participating on the channel, the described techniques can be used to support a much larger number of users than indicated by the MAC address. This can advantageously be used for slaves supporting data traffic. Data traffic is bursty: when a message arrives, the master and slave need to exchange some packets to convey the information, but in-between messages there may be a long idle time. By properly scheduling the traffic, slaves that are in the idle time between the messages are placed in the PARK mode, and slaves that need to exchange messages are in the ACTIVE mode. As soon as a message has been transmitted, the slave is put in the PARK mode, thereby giving up its MAC address. A parked slave can then be activated and this same MAC address reused for information exchange. That is, active and inactive slaves are swapped all the time between the ACTIVE mode and the PARK mode depending on their traffic requirements. In this way, the amount of slaves that virtually participate on the channel is much larger than indicated by the small MAC address.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a system comprising a wireless master unit and one or more wireless slave units, wherein each of the one or more wireless slave units has a unique identifier, the method comprising the steps of:

broadcasting a paging beacon packet to each of the one or more wireless slave units at fixed intervals during a master-to-slave time slot;

receiving the paging beacon packet in each of the one or more wireless slave units;

in each of the one or more wireless slave units, determining whether the received paging beacon packet includes the unique identifier belonging to the wireless slave unit;

in each of the one or more wireless slave units, retrieving a temporary address from the paging beacon packet if the received beacon packet included the unique identifier belonging to the wireless slave unit; and in each of the one or more wireless slave units, transmitting a response to the wireless master unit during a subsequent slave-to-master time slot if the received paging beacon packet included the unique identifier belonging to the wireless slave unit.

2. The method of claim 1, further comprising the steps of:

in each of the one or more wireless slave units, determining whether a subsequent traffic packet from the wireless master unit includes the temporary address; and in each of the one or more wireless slave units, transmitting a response to the wireless master unit during another subsequent slave-to-master time slot if the subsequent traffic packet from the wireless master unit includes the temporary address.

3. The method of claim 1, wherein the paging beacon packet is a type of beacon packet, wherein beacon packets have a header portion that includes a predefined temporary address that is never assigned to any of the one or more wireless slave units in the system.

4. A method of operating a system comprising a wireless master unit and one or more wireless slave units, wherein each of the one or more wireless slave units has a unique identifier, the method comprising the steps of:

defining a series of time slots comprising alternating occurrences of a master-to-slave time slot and a slave-to-master time slot, wherein each of the slave-to-master time slots comprises a plurality of slave-to-master sub-slots;

allocating a unique response number to each of the one or more wireless slave units;

broadcasting a polling beacon packet to each of the one or more wireless slave units at fixed intervals during a master-to-slave time slot;

for at least one of the one or more wireless slave units, transmitting a packet to the wireless master unit during a slave-to-master sub-slot that occurs N slave-to-master sub-slots after the polling beacon packet, wherein N is a function of the unique response number of the at least one or more wireless slave units.

5. The method of claim 4, further comprising the step of for said at least one of the one or more wireless slave units, detecting whether any master activity occurred in the master-to-slave time slot immediately preceding the slave-to-master sub-slot that occurs N slave-to-master sub-slots after the polling beacon packet, and wherein the step of transmitting the packet to the wireless master unit during a slave-to-master sub-slot is performed only if no master activity was detected in the master-to-slave time slot immediately preceding the slave-to-master sub-slot that occurs N slave-to-master sub-slots after the polling beacon packet.

6. The method of claim 4, further comprising the step of:
in the wireless master unit, receiving the packet from the at least one of the one or more wireless slave units; and
in the wireless master unit, determining which of the one or more wireless slave units transmitted the packet by determining which slave-to-master sub-slot the packet was received in, relative to the master-to-slave time slot during which the polling beacon packet was broadcast.

7. The method of claim 6, further comprising the steps of:
in the wireless master unit, broadcasting a paging beacon packet to the at least one of the one or more wireless slave units, wherein the paging beacon packet includes the unique identifier of the at least one of the one or more wireless slave units and a temporary address for later use in paging the at least one of the one or more wireless slave units.

8. The method of claim 4, wherein the step of allocating a unique response number to each of the one or more wireless slave units comprises:
in the wireless master unit, registering a unique identifier for each of the wireless slave units;
associating a unique response number with each of the registered unique identifiers; and
transmitting unique response numbers to the respective wireless slave units having the unique identifiers.

9. The method of claim 4, wherein the polling beacon packet is a type of beacon packet, wherein beacon packets have a header portion that includes a predefined temporary address that is never assigned to any of the one or more wireless slave units in the system.

10. The method of claim 4, wherein each of the slave-to-master sub-slots is a half slot.

11. A system comprising:
a wireless master unit; and
one or more wireless slave units, wherein each of the one or more wireless slave units has a unique identifier,
wherein:
the wireless master unit comprises:
means for broadcasting a paging beacon packet to each of the one or more wireless slave units at fixed intervals during a master-to-slave time slot; and
each of the wireless slave units comprises:
means for receiving the paging beacon packet;
means for determining whether the received paging beacon packet includes the unique identifier belonging to the wireless slave unit;
means for retrieving a temporary address from the paging beacon packet if the received beacon packet included the unique identifier belonging to the wireless slave unit; and
means for transmitting a response to the wireless master unit during a subsequent slave-to-master time slot if the received paging beacon packet included the unique identifier belonging to the wireless slave unit.

12. The system of claim 11, wherein each of the one or more wireless slave units further comprises:
means for determining whether a subsequent traffic packet from the wireless master unit includes the temporary address; and
means for transmitting a response to the wireless master unit during another subsequent slave-to-master time slot if the subsequent traffic packet from the wireless master unit includes the temporary address.

13. The system of claim 11, wherein the paging beacon packet is a type of beacon packet, wherein beacon packets have a header portion that includes a predefined temporary address that is never assigned to any of the one or more wireless slave units in the system.

14. A system comprising:
a wireless master unit; and
one or more wireless slave units, wherein each of the one or more wireless slave units has a unique identifier,
wherein:
the wireless master unit comprises:
means for defining a series of time slots comprising alternating occurrences of a master-to-slave time slot and a slave-to-master time slot, wherein each of the slave-to-master time slots comprises a plurality of slave-to-master sub-slots;
means for allocating a unique response number to each of the one or more wireless slave units; and
means for broadcasting a polling beacon packet to each of the one or more wireless slave units at fixed intervals during a master-to-slave time slot; and
each of the wireless slave units comprises:
means for transmitting a packet to the wireless master unit during a slave-to-master sub-slot that occurs N slave-to-master sub-slots after the polling beacon packet, wherein N is a function of the unique response number of the at least one or more wireless slave units.

15. The system of claim 14, wherein:
each of the wireless slave units further comprises means for detecting whether any master activity occurred in the master-to-slave time slot immediately preceding the slave-to-master sub-slot that occurs N slave-to-master sub-slots after the polling beacon packet, and
wherein the means for transmitting the packet to the wireless master unit during a slave-to-master sub-slot operates only if no master activity was detected in the master-to-slave time slot immediately preceding the slave-to-master sub-slot that occurs N slave-to-master sub-slots after the polling beacon packet.

16. The system of claim 14, wherein the wireless master unit further comprises:
means for receiving the packet from the at least one of the one or more wireless slave units; and
means for determining which of the one or more wireless slave units transmitted the packet by determining which slave-to-master sub-slot the packet was received in, relative to the master-to-slave time slot during which the polling beacon packet was broadcast.

17. The system of claim 16, wherein the wireless master unit further comprises:
means for broadcasting a paging beacon packet to the at least one of the one or more wireless slave units, wherein the paging beacon packet includes the unique identifier of the at least one of the one or more wireless slave units and a temporary address for later use in paging the at least one of the one or more wireless slave units.

18. The system of claim 14, wherein in the wireless master unit, the means for allocating a unique response number to each of the one or more wireless slave units comprises:

means for registering a unique identifier for each of the wireless slave units;

means for associating a unique response number with each of the registered unique identifiers; and means for transmitting unique response numbers to the respective wireless slave units having the unique identifiers.

19. The system of claim 14, wherein the polling beacon packet is a type of beacon packet, wherein beacon packets have a header portion that includes a predefined temporary address that is never assigned to any of the one or more wireless slave units in the system.

20. The method of claim 14, wherein each of the slave-to-master sub-slots is a half slot.

21. A wireless master unit for use in a system comprising the wireless master unit and one or more wireless slave units, the wireless master unit comprising:

means for generating a beacon packet having a header portion that includes a predefined temporary address that is never assigned to the one or more wireless slave units in the system; and means for broadcasting the beacon packet to each of the one or more wireless slave units at fixed intervals during a master-to-slave time slot.

22. A wireless slave unit for use in a system comprising a wireless master unit and one or more wireless slave units, the wireless slave unit comprising:

means for receiving a paging beacon packet that is broadcast from the wireless master unit at fixed intervals during a master-to-slave time slot;

means for determining whether the received paging beacon packet includes the unique identifier belonging to the wireless slave unit;

means for retrieving a temporary address from the paging beacon packet if the received paging beacon packet included the unique identifier belonging to the wireless slave unit; and means for transmitting a response to the wireless master unit during a subsequent slave-to-master time slot if the received paging beacon packet included the unique identifier belonging to the wireless slave unit.

23. The wireless slave unit of claim 22, further comprising:

means for determining whether a subsequent traffic packet from the wireless master unit includes the temporary address; and means for transmitting a response to the wireless master unit during another subsequent slave-to-master time slot if the subsequent traffic packet from the wireless master unit includes the temporary address.

24. The wireless slave unit of claim 22, wherein the paging beacon packet is a type of beacon packet, wherein beacon packets have a header portion that includes a predefined temporary address that is never assigned to any of the one or more wireless slave units in the system.

* * * * *